(12) United States Patent
Seshadri et al.

(10) Patent No.: US 11,436,035 B2
(45) Date of Patent: Sep. 6, 2022

(54) METHOD AND APPARATUS FOR VIRTUAL AGENT MANAGEMENT IN CLOUD COMPUTING

(71) Applicant: VMWARE, INC., Palo Alto, CA (US)

(72) Inventors: Karthik Seshadri, Bangalore (IN); Shrisha Chandrashekar, Bangalore (IN); Siddartha Laxman Karibhimanvar, Bangalore (IN); Akash Srivastava, Bangalore (IN); Rachil Chandran, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 381 days.

(21) Appl. No.: 16/812,396

(22) Filed: Mar. 9, 2020

(65) Prior Publication Data
US 2021/0216347 A1 Jul. 15, 2021

(30) Foreign Application Priority Data
Jan. 13, 2020 (IN) .............................. 202041001469

(51) Int. Cl.
G06F 9/455 (2018.01)
G06Q 10/06 (2012.01)
H04L 9/40 (2022.01)

(52) U.S. Cl.
CPC ...... *G06F 9/45558* (2013.01); *G06Q 10/06315* (2013.01); *H04L 63/083* (2013.01); G06F 2009/45595 (2013.01); G06Q 2220/00 (2013.01)

(58) Field of Classification Search
CPC .......................... G06F 9/455; G06Q 10/06315
See application file for complete search history.

(56) References Cited

U.S. PATENT DOCUMENTS

2018/0157512 A1\* 6/2018 Savov .................. G06F 9/5077

\* cited by examiner

*Primary Examiner* — Sulaiman Nooristany
(74) *Attorney, Agent, or Firm* — Loza & Loza, LLP

(57) ABSTRACT

System and method for virtual agent management in a cloud architecture deploys multiple virtual appliances with proxy services in the cloud architecture, instantiates virtual agents in the virtual appliances, communicates with a cloud framework using the proxy services, and controls the virtual agents based on communications with the cloud framework.

20 Claims, 10 Drawing Sheets

METHOD AND APPARATUS FOR VIRTUAL AGENT MANAGEMENT IN CLOUD COMPUTING

RELATED APPLICATION

Benefit is claimed under 35 U.S.C. 119(a)-(d) to Foreign Application Serial No. 202041001469 filed in India entitled "METHOD AND APPARATUS FOR VIRTUAL AGENT MANAGEMENT IN CLOUD COMPUTING", on Jan. 13, 2020, by VMware, Inc., which is herein incorporated in its entirety by reference for all purposes.

BACKGROUND

Cloud architectures can be used in cloud computing and cloud storage systems for offering software as a service (SaaS) cloud services. Examples of cloud architectures include the VMware Cloud architecture software, Amazon EC2™ web service, and OpenStack™ open source cloud computing service. SaaS cloud service is a type of software distribution cloud service in which a service provider hosts software applications for customers in a cloud environment.

With increasing adaptation of cloud computing and cloud storage by enterprises, enterprise information technology (IT) solutions for operations and automation are increasingly delivered as SaaS, with abilities to function across public clouds and private clouds. However, although vendors in the public cloud can provide application programming interfaces (APIs) for accessing software services remotely, it is difficult for customers in existing private cloud infrastructures to access software services remotely. Consequently, it is imperative for enterprise services to have virtual agents running in customer private clouds through which enterprise services can provide remote access functionality for the customer private clouds. Various types of enterprise solutions use different types of virtual agents with capabilities that may evolve over time. Because different types of virtual agents are used and the capabilities of virtual agents may evolve over time, there is a need to remotely manage (e.g., install and/or upgrade) and monitor the virtual agents executing in private cloud when needed.

SUMMARY

System and computer-implemented method for virtual agent management in a cloud architecture include deploying multiple virtual appliances in the cloud architecture, where each of the virtual appliances includes a proxy service, instantiating at least one virtual agent in each of the virtual appliances, where each virtual agent performs a remote access function in the cloud architecture, communicating with a cloud framework using the proxy service in each of the virtual appliances, and controlling the at least one virtual agent in each of the virtual appliances based on communications with the cloud framework.

A non-transitory computer-readable storage medium containing program instructions for virtual agent management in a cloud architecture, where execution of the program instructions by one or more processors causes the one or more processors to perform steps including deploying multiple virtual appliances in the cloud architecture, where each of the virtual appliances includes a proxy service, instantiating at least one virtual agent in each of the virtual appliances, where each virtual agent performs a remote access function in the cloud architecture, communicating with a cloud framework using the proxy service in each of the virtual appliances, and controlling the at least one virtual agent in each of the virtual appliances based on communications with the cloud framework.

A system for virtual agent management in a cloud architecture includes memory and one or more processors. The one or more processors are configured to deploy multiple virtual appliances in the cloud architecture, where each of the virtual appliances includes a proxy service, instantiate at least one virtual agent in each of the virtual appliances, where each virtual agent performs a remote access function in the cloud architecture, communicate with a cloud framework using the proxy service in each of the virtual appliances, and control the at least one virtual agent in each of the virtual appliances based on communications with the cloud framework.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," "one aspect," "an aspect," "various aspects," or similar language means that a particular feature, structure, or characteristic described in connection with the indicated embodiment is included in at least one embodiment of the present invention. Thus, the phrases "in one embodiment," "in an embodiment," "in one aspect," "in an aspect," "in various aspects," and similar language throughout this specification may, but do not necessarily, all refer to the same embodiment.

Figure 1:
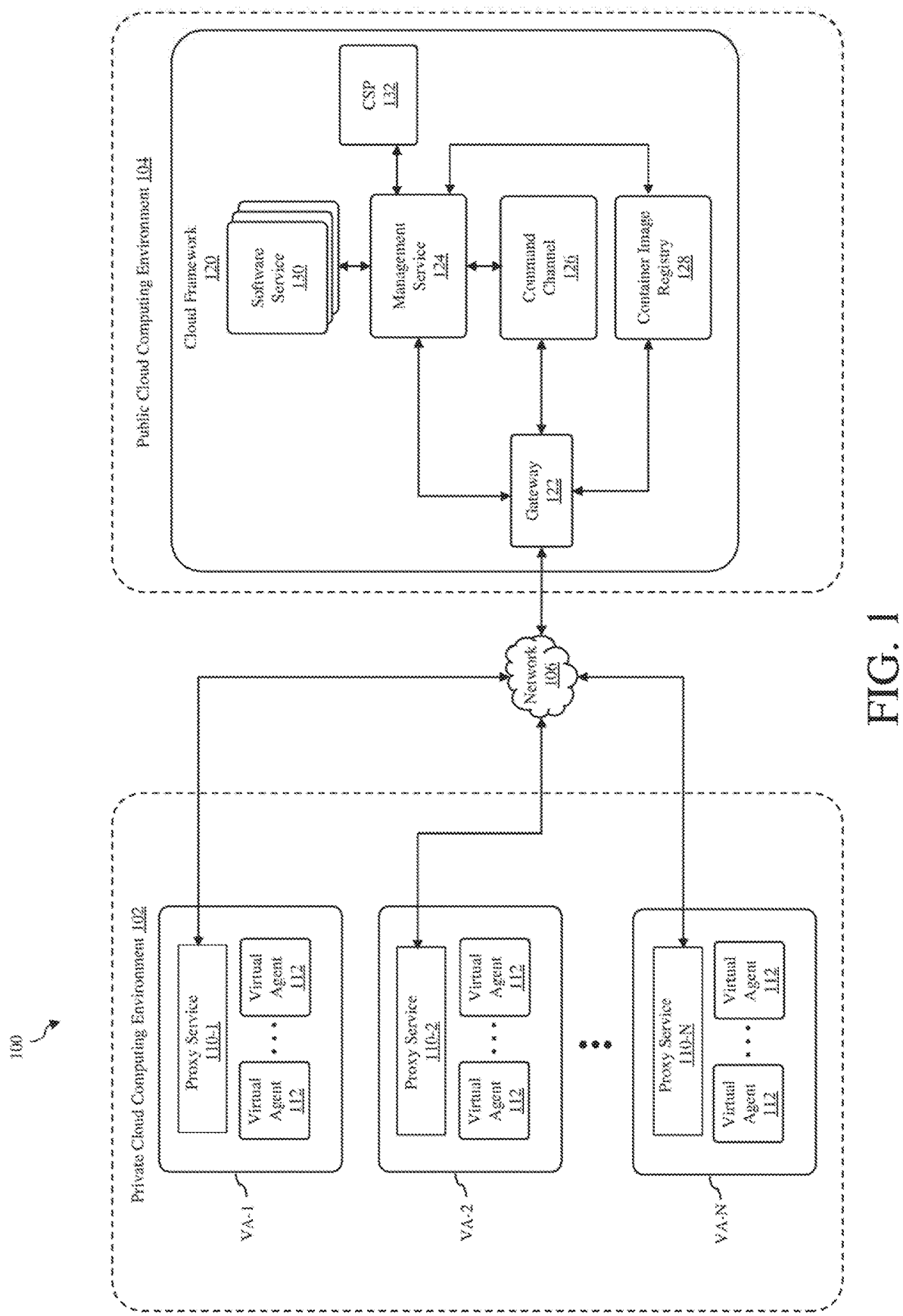
FIG. 1 is a block diagram of a hybrid cloud system that may be used to describe a method and apparatus for virtual agent management in a cloud architecture in accordance with various aspects of the invention.

Turning now to FIG. 1, a block diagram of a hybrid cloud system 100 in which the present invention may be implemented in accordance with an embodiment of the invention is shown. The hybrid cloud system 100 includes at least one private cloud computing environment 102 and at least one public cloud computing environment 104 that are connected via a network 106. The hybrid cloud system 100 is configured to provide a common platform for managing and executing commands, instructions, and/or workloads seamlessly between the private and public cloud computing environments. In one embodiment, the private cloud computing environment 102 may be controlled and administrated by a particular enterprise or business organization, while the public cloud computing environment 104 may be operated by a cloud computing service provider and exposed as a service available to account holders, such as the particular enterprise in addition to other enterprises. In some embodiments, the private cloud computing environment 102 may be a private or on-premise data center.

The private cloud computing environment 102 of the hybrid cloud system 100 includes one or more virtual appliances VA-1, VA-2, . . . , VA-N, where N is a positive integer, in which proxy services 110-1, 110-2, . . . , 110-N and virtual agents 112 reside. As used herein, the term "virtual appliance" refers to any software processing entity that can run on a computer system, such as a software application, a software process, a virtual machine (VM), e.g., a VM supported by virtualization products of VMware, Inc., and a software "container", e.g., a Docker container. In some instances, the virtual computing instances will be described as being virtual machines, although embodiments of the invention described herein are not limited to virtual machines. The proxy service 110-1, 110-2, . . . , 110-N are configured to communicate with the public cloud computing environment 104 of the hybrid cloud system 100 and orchestrate or execute instructions received from the public cloud computing environment 104, and to instantiate the virtual agents in the virtual appliances VA-1, VA-2, . . . , VA-N. The virtual agents 112 in the virtual appliances VA-1, VA-2, . . . , VA-N can provide remote access functionality for software services in the public cloud computing environment 104. Various types of software services use different types of virtual agents with capabilities that may evolve over time.

The private cloud computing environment 102 of the hybrid cloud system 100 includes computing and/or storage infrastructures to support the virtual appliances VA-1, VA-2, . . . , VA-N. In some embodiments, the private cloud computing environment 102 includes one or more host computer systems ("hosts"). The hosts may be constructed on a server grade hardware platform, such as an x86 architecture platform. The hardware platform of each host may include conventional components of a computing device, such as one or more processors (e.g., CPUs), system memory, a network interface, storage system, and other I/O devices such as, for example, a mouse and a keyboard. Each host may be configured to provide a virtualization layer that abstracts processor, memory, storage, and networking resources of the hardware platform into virtual appliances, e.g., software applications, software processes, virtual machines and software containers, which run concurrently on the same host. For example, virtual machines may run on top of a software interface layer, which can also be referred to as a hypervisor, which enables sharing of the hardware resources of the host by the virtual machines. One example of the hypervisor that may be used in an embodiment described herein is a VMware ESXi™ hypervisor provided as part of the VMware vSphere® solution made commercially available from VMware, Inc. The hypervisor may run on top of the operating system of the host or directly on hardware components of the host. For other types of virtual appliances, the host may include other virtualization software platforms to support those virtual appliances, such as Docker virtualization platform to support software containers.

The private cloud computing environment 102 of the hybrid cloud system 100 communicates with the public cloud computing environment 104 of the hybrid cloud system through the network 106. In some embodiments, the private cloud computing environment 102 includes a gateway device (not shown) configured to provide the virtual appliances VA-1, VA-2, . . . , VA-N and other devices in the private cloud computing environment 102 with connectivity to external devices via the network 106. The gateway device may be implemented as a virtual appliance such as a software application, a software process, a VM, or a software container. The gateway device may manage external public Internet Protocol (IP) addresses for the virtual appliances VA-1, VA-2, . . . , VA-N and route traffic incoming to and outgoing from the private cloud computing environment and provide networking services, such as firewalls, network address translation (NAT), dynamic host configuration protocol (DHCP), load balancing, and virtual private network (VPN) connectivity over the network 106.

The public cloud computing environment 104 of the hybrid cloud system 100 is configured to dynamically provide an enterprise or users of an enterprise with at least one cloud framework 120 in which an administrator of the enterprise may provision virtual appliances, e.g., the virtual appliances VA-1, VA-2, . . . , VA-N, and install and execute various software services and/or applications in the virtual appliances. In some embodiments, the cloud framework 120 provides a framework for executing commands on remote virtual appliances, e.g., the virtual appliances VA-1, VA-2, . . . , VA-N, deployed in the private cloud computing environment 102, which can be located in customer data centers. Software services can register commands in the cloud framework 120 and have the registered commands executed in remote virtual appliances. Commands that can be executed in remote virtual appliances may include operating system (OS) commands and/or Representational state transfer (REST) commands. An OS command can be executed in an operating system shell, while a REST command makes API calls on an address provided to the REST command. In some embodiments, a command includes information regarding the command content, at least one identification (ID) of a virtual appliance at which the command is to be executed, command content, status information and/or callback address (e.g., Uniform Resource Locator (URL)).

In the embodiment of FIG. 1, the cloud framework 120 includes at least one gateway device 122 configured to provide components of the cloud framework 120 with connectivity to external devices via the network 106, a management service 124, a command channel 126, a container image registry 128, one or more software services 130, and a Cloud Services Platform (CSP) 132. The gateway device 122 may be implemented as a virtual appliance such as a software application, a software process, a VM, or a software container. The gateway device may manage external public IP addresses for the cloud framework 120 and route traffic incoming to and outgoing from the public cloud computing environment 104 and provide networking services, such as firewalls, NAT, DHCP, load balancing, and VPN connectivity over the network 106. In some embodiments, the gateway device 122 includes an API Gateway that provides an API, which is tailored to each application or client and is responsible for request routing, composition, and protocol translation. The management service 124 is a software service that is configured to manage remote virtual appliances, e.g., the virtual appliances VA-1, VA-2, . . . , VA-N, deployed in the private cloud computing environment 102. One example of the management service that may be used in an embodiment described herein is a VMware Cloud Management Business Unit (CMBU) SaaS service provided as part of the VMware Symphony CMBU SaaS solution made commercially available from VMware, Inc. The command channel 126 is configured to store command related information and/or transmit command related information. In some embodiments, the command channel is a software service. The container image registry 128 is configured to store or host one or more container images. The CSP 132 is configured to provide a common platform for various cloud services by providing one or more functionalities such as authentication, tenancy, authorization and/or billing support. Although not explicitly shown in FIG. 1, the public cloud computing environment 104 may include hardware resources having computing resources (e.g., hosts), storage resources (e.g., one or more storage array systems, such as a storage area network (SAN), and/or networking resources in which the cloud framework 120 resides and executes.

Figure 2:
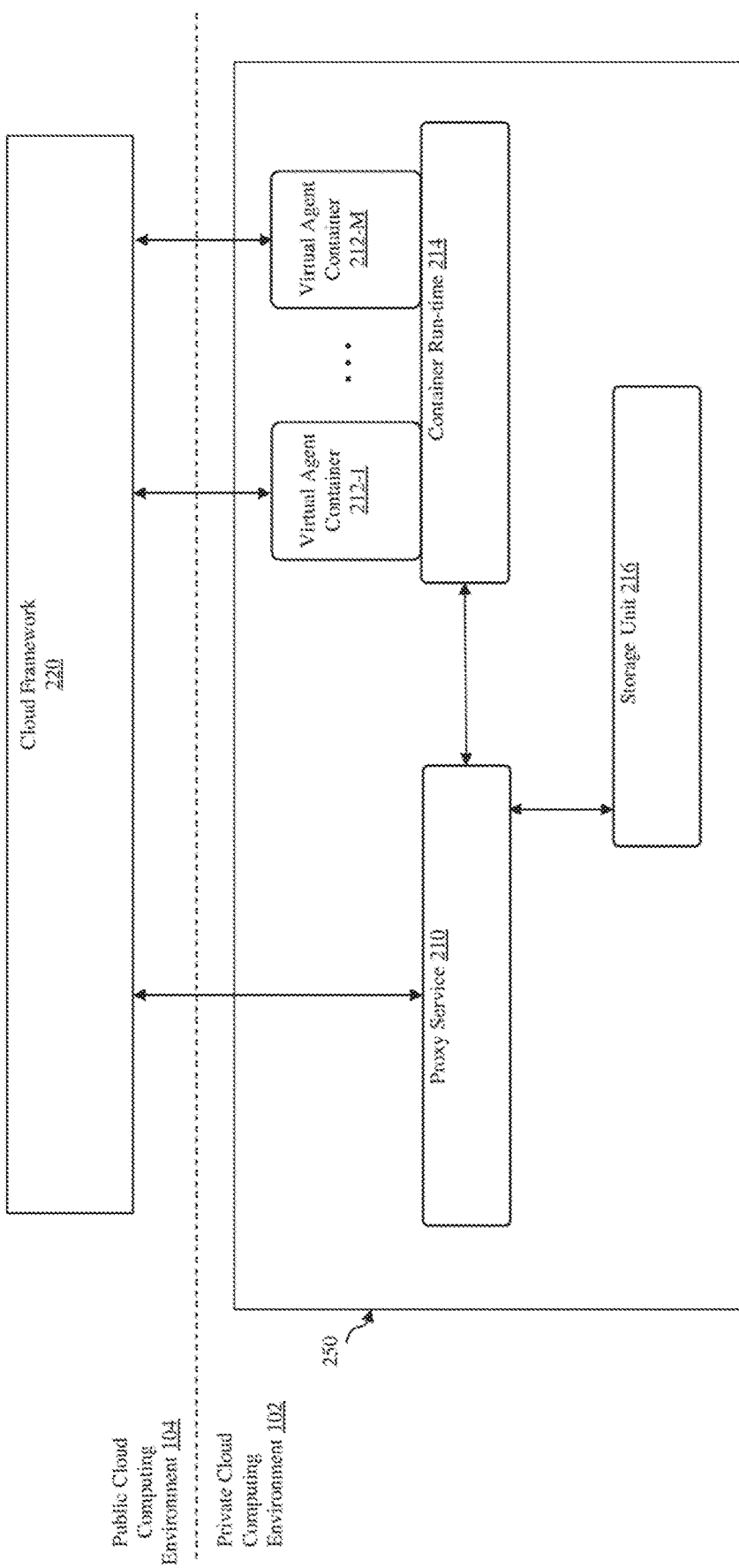
FIG. 2 depicts a virtual appliance that communicates with a cloud framework.

FIG. 2 depicts a virtual appliance 250 that communicates with a cloud framework 220. The virtual appliance 250 is an embodiment of the virtual appliances VA-1, VA-2, . . . , VA-N in the private cloud computing environment 102 of the hybrid cloud system 100 depicted in FIG. 1, while the cloud framework 220 is an embodiment of the cloud framework 120 in the public cloud computing environment 104 of the hybrid cloud system 100 depicted in FIG. 1. In the embodiment depicted in FIG. 2, the virtual appliance 250 includes a proxy service 210, a container run-time (e.g., a Docker run-time or other type of container run-time) 214, one or more virtual agents 212-1 . . . 212-M (M being a positive integer), which operate as one or more containers on top of the container run-time 214, and a storage unit 216 that is operably connected to the proxy service. In some embodiments, the virtual appliance 250 is a virtual appliance (e.g., a Photon OS based VMware virtual appliance) published as an Open Virtualization Appliance (OVA) file and deployed inside a customer's data center. In these embodiments, each virtual appliance deployed in a customer's data center is identified through a unique proxy identification (ID), which is created during proxy registration process described in detail below. The proxy service 210 is configured to communicate with the public cloud computing environment 104 of the hybrid cloud system 100 and orchestrate or execute instructions received from the public cloud computing environment 104, which are sent as commands to the proxy service 210. The proxy service 210 is further configured to pull container images of the virtual agent containers 212-1 . . . 212-M using the container run-time 214 and instantiate the virtual agents in the virtual appliance 250 using these container images. The virtual agent containers 212-1 . . . 212-M can provide remote access functionality for the software services 130 in the public cloud computing environment 104. Various types of software services use different types of virtual agent containers with capabilities that may evolve over time. The storage unit 216 is used to store information, such as configurations (e.g., network proxy configurations), security certificates, and other data, which can be retrieved by the proxy service. The storage unit 216 can be implemented as one or more local storage devices (e.g., one or more hard disks, flash memory modules, solid state disks and optical disks) and/or a storage interface that enables the proxy service to communicate with one or more network data storage systems. Example of a storage interface is a host bus adapter (HBA) that couples the host to one or more storage arrays, such as a storage area network (SAN) or a network-attached storage (NAS), as well as other network data storage systems.

Figure 3:
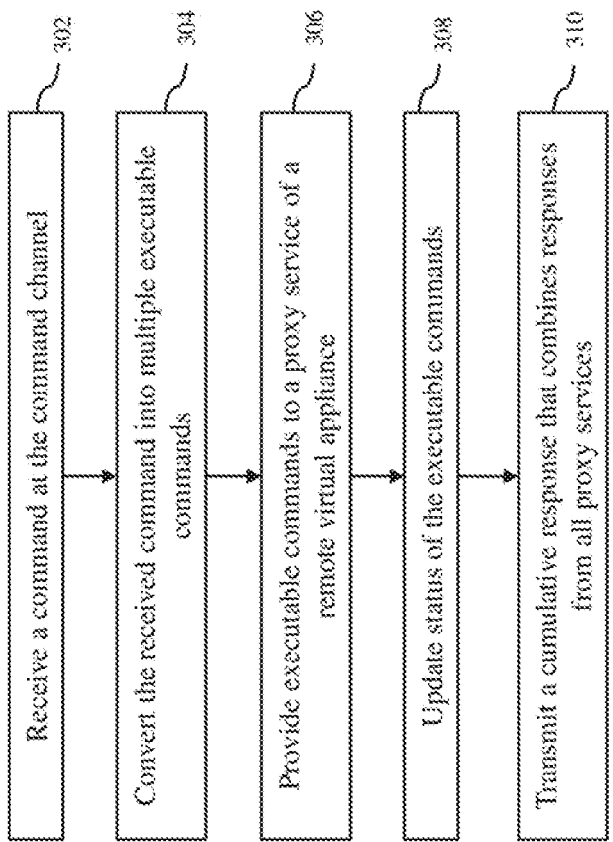
FIG. 3 is a flow diagram of a command execution process that can be implemented in the hybrid cloud system depicted in FIG. 1 in accordance with various aspects of the invention.

FIG. 3 is a flow diagram of a command execution process that can be implemented in the hybrid cloud system 100 depicted in FIG. 1 in accordance with various aspects of the invention. At step 302, a command is received at the cloud framework 120 (e.g., at the command channel 126). The command may be received from one or more of the software services 130 and/or the management service 124. Subsequently, at step 304, the received command is converted into multiple executable commands based on number of proxy IDs present in the command, for example, in the command channel 126. Each executable command has only one proxy ID field and may have one or more additional fields such as response content field that represents the response and status information. At step 306, when a proxy service of a remote virtual appliance polls for commands, all executable commands for that proxy service are provided to the proxy service and the proxy service individually acknowledges each executable command and tries to execute the executable commands, for example, using one or more virtual agents in the remote virtual appliance. At step 308, depending on the status of command execution in a corresponding proxy service, the corresponding executable command status is updated and can eventually affect the status of a parent command. At step 310, once all the executable commands are executed, a cumulative response that combines responses from all proxy services are sent to a caller asynchronously by invoking the callback address (e.g., URL) specified in the executable commands.

To execute commands from the cloud framework 120 at a proxy service, the proxy service needs to register with the management service 124, which validates the proxy service and loads one or more virtual agents 112 into the proxy service.

Figure 4:
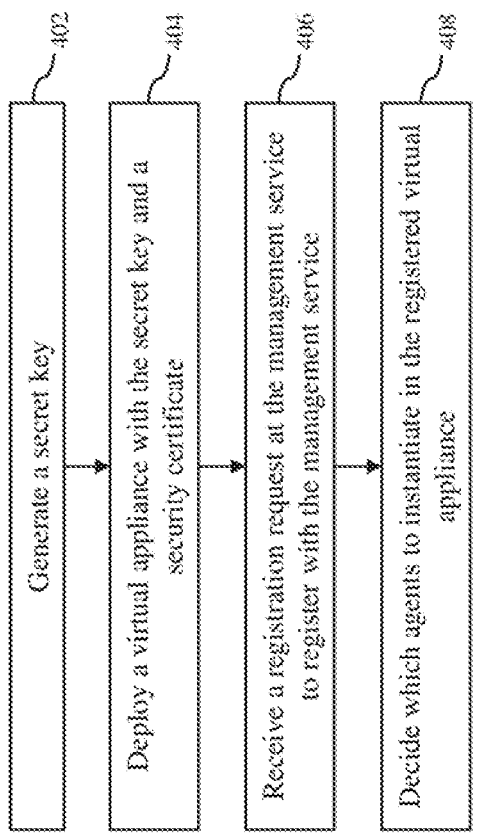
FIG. 4 is a flow diagram of a virtual appliance registration process that can be implemented in the hybrid cloud system depicted in FIG. 1 in accordance with various aspects of the invention.

FIG. 4 is a flow diagram of a virtual appliance registration process that can be implemented in the hybrid cloud system 100 depicted in FIG. 1 in accordance with various aspects of the invention. At block 402, a secret key is generated. The secret key, which may be a one-time key (OTK), may be generated based on user input. In some embodiments, a user or an administrator inputs the secret key during virtual application deployment process. The secret key may contain proxy ID, secret information, customer, and an address (e.g., a URL) for registration. In some embodiments, the secret key may be associated with a service tag. At block 404, a virtual appliance is deployed with the secret key and a security certificate. The security certificate may be automatically generated in the virtual appliance or provided to the virtual appliance during virtual application deployment process. At block 406, a registration request (e.g., a registration API call) is received at the management service 124 to register with the management service from a proxy service in the deployed virtual appliance. The registration request includes the secret key and the security certificate. The management service processes the registration request, for example, by validating the secret key, mapping the proxy ID, which uniquely identifies the deployed virtual appliance to a customer ID, and exchanging certificate pair with the proxy service that secures the future communication between the proxy service and the management service. At block 408, the management service uses one or more service tag values to decide which agents to instantiate in the registered virtual appliance.

Once a virtual appliance is deployed in the private cloud computing environment 102 of the hybrid cloud system 100 (e.g., in a customer data center), services in the public cloud computing environment 104 of the hybrid cloud system 100 can start using a proxy service in the deployed virtual appliance to instantiate their respective virtual agents in the virtual appliance through service tagging. After a new service is tagged to a proxy service in a virtual appliance, the management service 124 can automatically instantiate one or more virtual agents in the virtual appliance.

Figure 5:
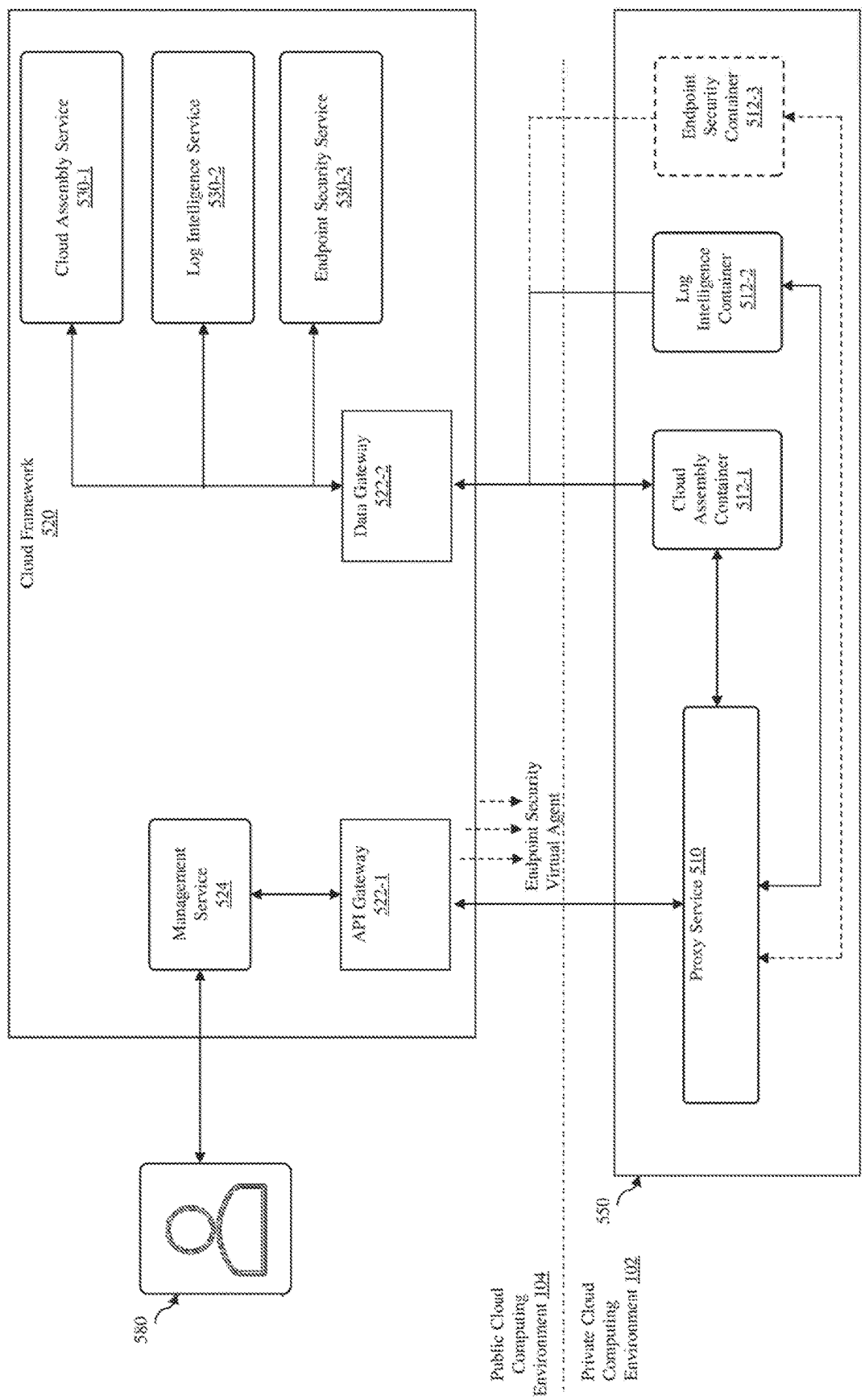
FIG. 5 depicts a virtual appliance that includes a proxy service to which software services of a cloud framework are tagged.

FIG. 5 depicts a virtual appliance 550 that includes a proxy service 510 to which software services 530-1, 530-2, 530-3 of a cloud framework 520 are tagged. In the embodiment depicted in FIG. 5, a user 980, which may be an administrator, can deploy, monitor, troubleshoot and upgrade the virtual appliance 550 and virtual agents in the virtual appliance 550 (e.g., a cloud assemble container 512-1 and a log intelligence container 512-2). A management service 524 in the cloud framework 520 communicates with the proxy service 510 through an API gateway 522-1, while the virtual agents in the virtual appliance 550 (e.g., the cloud assemble container 512-1 and the log intelligence container 512-2) communicates with their respective software services 530 in the public cloud computing environment 104 through a data gateway 522-2. The virtual appliance 550 is an embodiment of the virtual appliances VA-1, VA-2, . . . , VA-N in the private cloud computing environment 102 of the hybrid cloud system 100 depicted in FIG. 1, while the management service 524 is an embodiment of the management service 124 in the public cloud computing environment 104 of the hybrid cloud system 100 depicted in FIG. 1. The cloud assemble container 512-1 is configured to provision and list of resources (virtual machines, blueprints, etc.) in customer data centers and is controlled by a cloud assembly service 530-1 executing in the cloud framework 520. The log intelligence container 512-2 is configured to collect and forward logs from customer deployments to a log intelligence service 530-2 executing in the cloud framework 520.

In the embodiment depicted in FIG. 5, the cloud assembly service 530-1 and the log intelligence service 530-2 have been tagged to the proxy service 510 of the virtual appliance 550. Consequently, the management service 524 automatically instantiates the cloud assemble container 512-1 and the log intelligence container 512-2 in the virtual appliance 550. When an endpoint security service 530-3 is tagged to the proxy service 510 of the virtual appliance 550, the management service 524 can push an endpoint security virtual agent of the endpoint security service 530-3 to the proxy service 510 of the virtual appliance 550 and instantiates an endpoint security virtual agent 512-3 in the virtual appliance 550, for example, as a virtual container.

Before a software service 130 can use the management service 124 to remote manage one or more virtual agents 112 in the private cloud computing environment 102 of the hybrid cloud system 100 (e.g., in a customer data center), the software service needs to register agent information with the management service.

Figure 6:
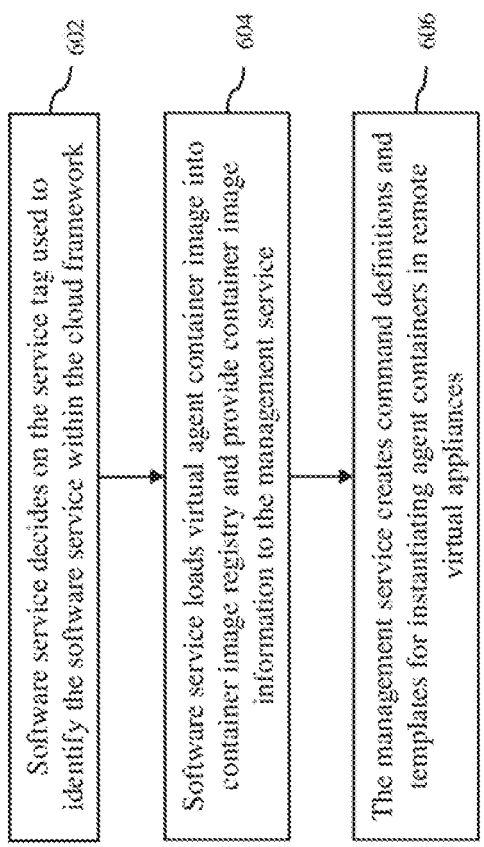
FIG. 6 is a flow diagram of a virtual agent registration process that can be implemented in the hybrid cloud system depicted in FIG. 1 in accordance with various aspects of the invention.

FIG. 6 is a flow diagram of a virtual agent registration process that can be implemented in the hybrid cloud system 100 depicted in FIG. 1 in accordance with various aspects of the invention. At block 602, each software service decides on the service tag it will use to identify the software service within the cloud framework 120. In some embodiments, a service registers more than one virtual agent for the service tag with the management service. In these embodiments, the management service identifies these virtual agents as features and associates the virtual agents with the service tag. At block 604, each software service loads container image(s) of one or more virtual agent into the container image registry and provide container image information, such as container image tag information and container image version information, to the management service 124. At block 606, the management service 124 creates command definitions and templates for instantiating or starting agent containers in remote virtual appliances based on the service tags. In some embodiments, a command definition is associated with the version of the registered virtual agent and is later used to instantiate a virtual agent container in a remote virtual appliance. In these embodiments, if a newer version of a virtual agent is released, the newer version of the virtual agent is registered with the management service to provide specific version information to the management service.

Prior to instantiating a virtual agent in a virtual appliance, the virtual agent is associated to a proxy service of the virtual appliance in a virtual agent subscription process such that the proxy service can decide which virtual agent or agents to instantiate in the virtual appliance. In some embodiments, the virtual agent subscription process is performed based on the service tag field of a proxy service.

Figure 7:
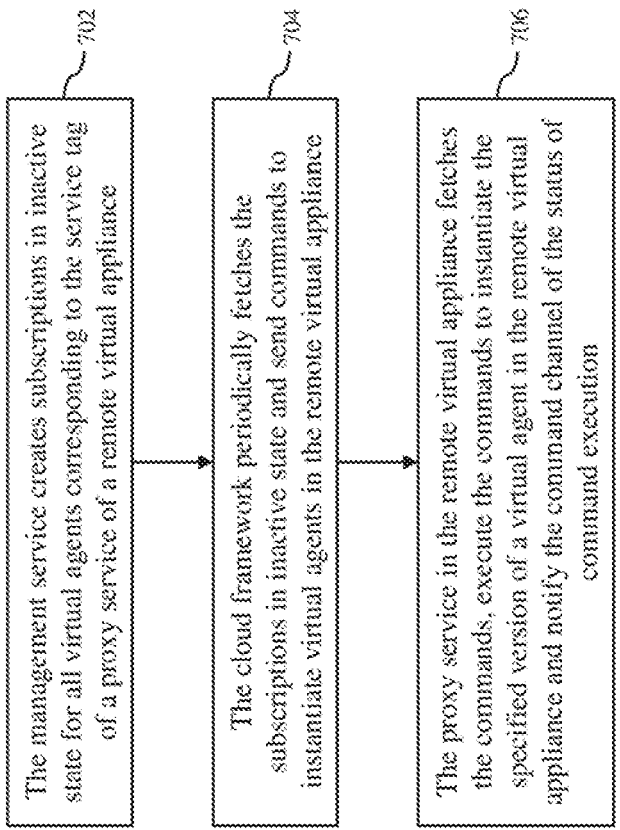
FIG. 7 is a flow diagram of a virtual agent subscription process that can be implemented in the hybrid cloud system depicted in FIG. 1 in accordance with various aspects of the invention.

FIG. 7 is a flow diagram of a virtual agent subscription process that can be implemented in the hybrid cloud system 100 depicted in FIG. 1 in accordance with various aspects of the invention. At block 702, the management service 124 creates subscriptions in inactive state for all virtual agents corresponding to the service tag of a proxy service of a remote virtual appliance. In one embodiment, a subscription is an association between the proxy ID of a proxy service, a virtual agent and the version of a virtual agent. At block 704, the cloud framework 120 (e.g., the command channel 126 or a periodic service) periodically fetches the subscriptions in inactive state and sends commands to instantiate the corresponding virtual agents in the remote virtual appliance, for example, based on the command definition in virtual agent version information. The virtual agent subscriptions may still be marked as inactive after the command to instantiate the corresponding virtual agent is posted. At block 706, the proxy service in the remote virtual appliance fetches these commands through periodic polling and executes these commands to instantiate the specified version of a virtual agent in the remote virtual appliance, and notifies the command channel 126 of the status of command execution. The command channel 126 may further notify the management service 124 of the status of command execution.

Virtual agents in remote virtual appliances, such as virtual agents 112 in the virtual appliances VA-1, VA-2, ..., VA-N in the private cloud computing environment 102, can be updated when needed. In some embodiments, virtual agents are updated periodically. For example, periodic upgrading virtual agents in remote virtual appliances is implemented when a user intends to upgrade a virtual agent when a newer version of the virtual agent is registered with the management service, which ensures that all the instances of this virtual agent running inside a virtual appliance are in the same version. In these embodiments, the functionality of the virtual agent must be immune to restarts, which happen during upgrade. In some other embodiments, virtual agents are updated only when virtual appliances in which the virtual agent resides restart. For example, on-restart upgrading virtual agents in remote virtual appliances is implemented when a user intends to upgrade a virtual agent to a newer version only during a restart of a virtual appliance in which the virtual agent reside, which is advantageous if restart of the virtual agent for upgrade adversely affects its functionality.

Figure 8:
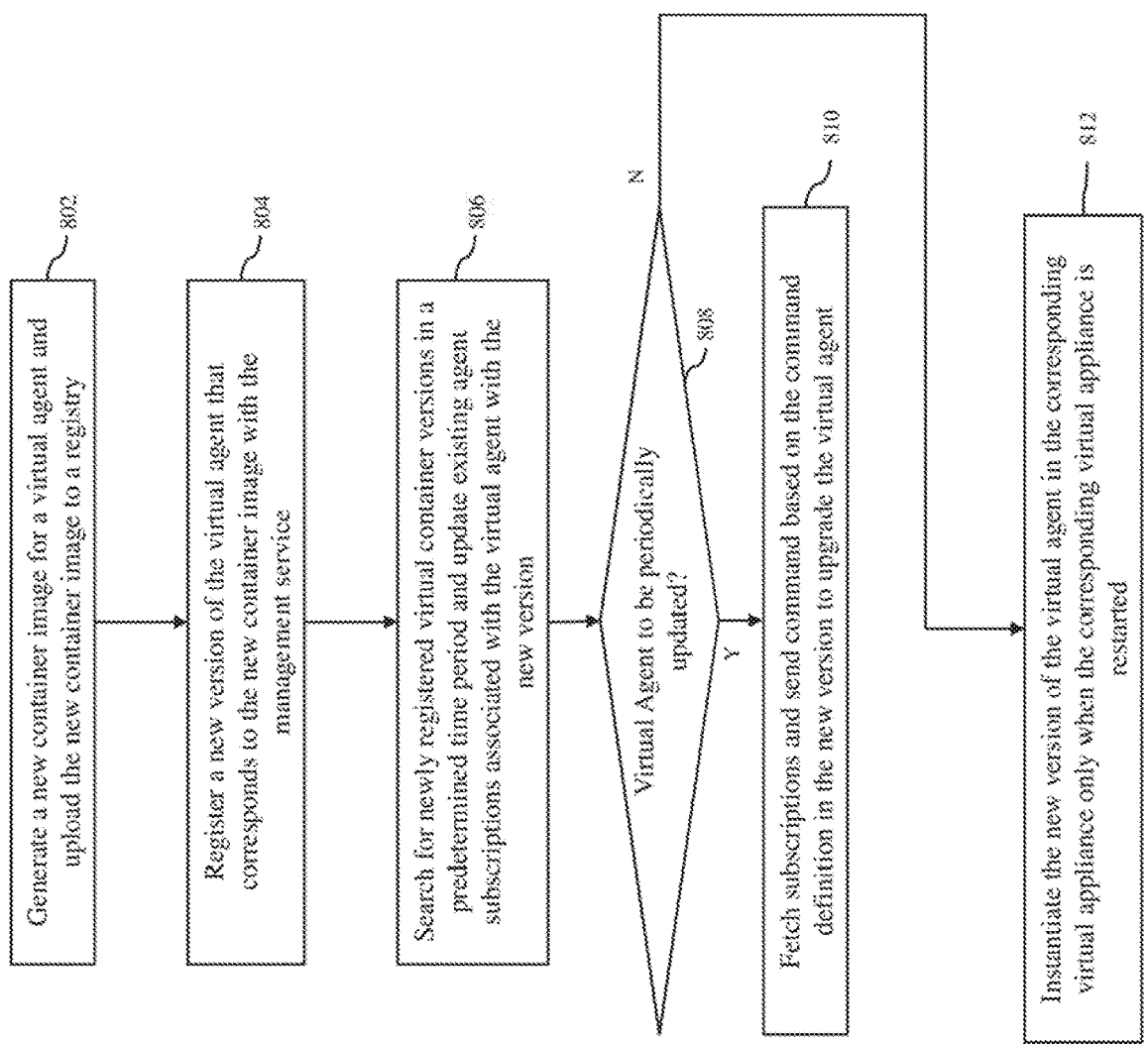
FIG. 8 is a flow diagram of a virtual agent update process that can be implemented in the hybrid cloud system depicted in FIG. 1 in accordance with various aspects of the invention.

FIG. 8 is a flow diagram of a virtual agent update process that can be implemented in the hybrid cloud system 100 depicted in FIG. 1 in accordance with various aspects of the invention. At block 802, a software service (e.g., the software service 130 in FIG. 1) generates a new container image for a virtual agent and uploads the generated new container image to a registry (e.g., the container image registry 128 in FIG. 1). At block 804, a new version of the virtual agent that corresponds to the new container image is registered with the management service 124. During the registration process, a new command definition and a new template to upgrade the virtual agent is created in command channel and is associated with the newly registered agent version. At block 806, a periodic subscription upgrade service searches for newly registered virtual container versions in a predetermined time period (e.g., the last 30 minutes) and updates all the existing agent subscriptions associated with the virtual agent with the new version and marks them as inactive. At block 808, it is determined if the virtual agent is set up to be periodically upgraded or to be upgraded only when a corresponding virtual appliance is restarted. If the virtual agent is set up to be periodically upgraded, the periodic subscription upgrade service invokes another service to fetch subscriptions in inactive state and sends one or more commands based on the command definition in the agent version through the command channel to upgrade the virtual agent, as shown at block 810. If the virtual agent is set up to be upgraded only when a corresponding virtual appliance is restarted, the new version of the virtual agent is instantiated in the corresponding virtual appliance only when the corresponding virtual appliance is restarted, as shown at block 812.

The operation status of a virtual agent and a corresponding virtual appliance in which the virtual agent reside can be monitored by the private cloud computing environment 102 and/or the public cloud computing environment 104 of the hybrid cloud system 100. In some embodiments, the CPU, memory and storage utilization at a virtual appliance and/or a virtual agent container are/is periodically reported to and stored in the management service. The state and health of virtual agents and corresponding proxy services can be displayed to a user through a user interface (UI). Metrics for activities in a virtual appliance such as virtual agent version upgrade and virtual agent instantiating can be tracked to visibly depict the operation of virtual agents. When irregularity in virtual agent or virtual appliance operation is discovered, troubleshooting actions can be performed by a user such as an administrator from the UI to adjust the state of a virtual agent or a virtual appliance. For example, operations such as reboot of a virtual appliance, uploading a support bundle of a virtual appliance, checking for upgrade of a virtual appliance and upgrading a virtual appliance or restarting a virtual agent, upgrading a virtual agent or displaying recent agent logs can be performed.

Figure 9:
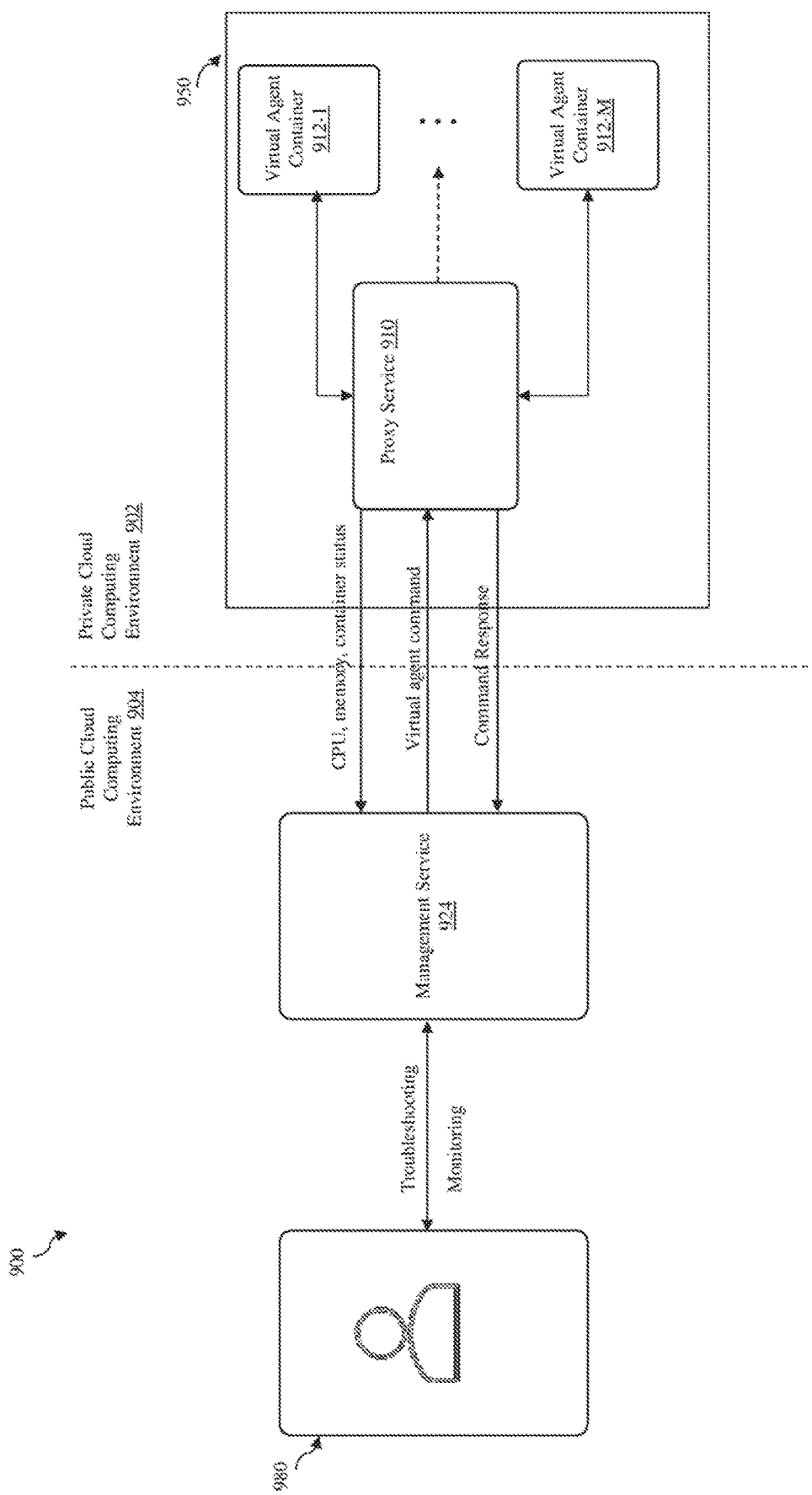
FIG. 9 depicts a hybrid cloud system in which a user troubleshoots and monitors a virtual appliance in accordance with various aspects of the invention.

FIG. 9 depicts a hybrid cloud system 900 in which a user 980 troubleshoots and monitors a virtual appliance 950 using a management service 924. The virtual appliance 950 is an embodiment of the virtual appliances VA-1, VA-2, ..., VA-N in the private cloud computing environment 102 of the hybrid cloud system 100 depicted in FIG. 1, while the management service 924 is an embodiment of the management service 124 in the public cloud computing environment 104 of the hybrid cloud system 100 depicted in FIG. 1. In the hybrid cloud system 900 depicted in FIG. 9, the user 980, which may be an administrator, monitors the operation status of the virtual appliance 950 and one or more virtual agents 912-1 ... 912-M in the virtual appliance 950. The user 980 and the management service 924 are located in a public cloud computing environment 904 of the hybrid cloud system 900, while the virtual appliance 950 is located in a private cloud computing environment 902 of the hybrid cloud system 900. Operational parameters, such as CPU usage, memory usage and virtual agent container status, are gathered by the virtual appliance 950 (e.g., by the virtual agents 912-1 ... 912-M) and transmitted to the management service 924, which is relayed to the user. When irregularity in virtual agent or virtual appliance operation is discovered, troubleshooting actions can be performed by the user 980 to adjust the state of one or more of the virtual agents 912-1 ... 912-M or the virtual appliance 950 in the form of a virtual agent command, which can cause actions such as restart and upgrade in at least one virtual agent. A response to the virtual agent command, which may include updated status of the virtual agents 912-1 ... 912-M or the virtual appliance 950, can be transmitted back to the management service 924, which then relays the response to the user.

Figure 10:
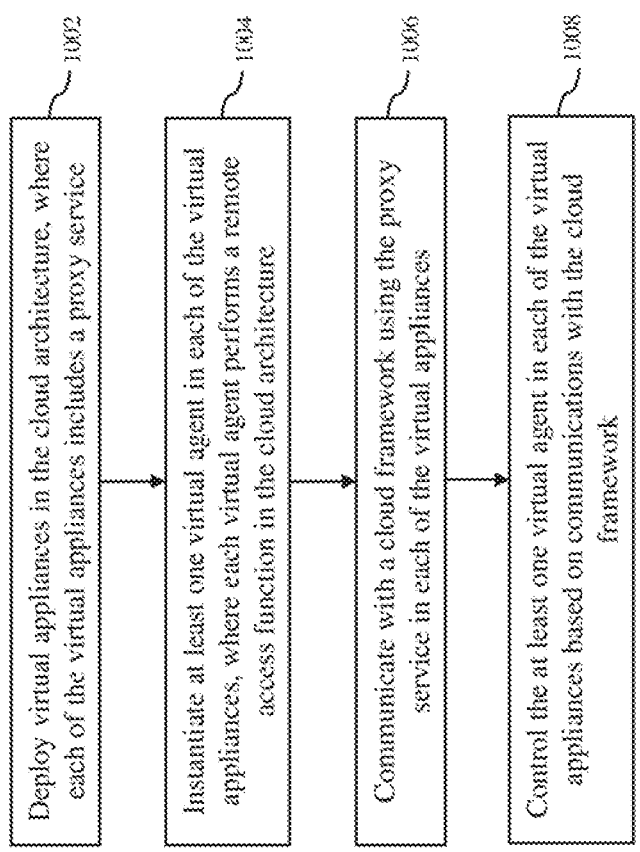
FIG. 10 is a flow diagram of a computer-implemented method for virtual agent management in a cloud architecture in accordance with an embodiment of the invention.

A computer-implemented method for virtual agent management in a cloud architecture in accordance with an embodiment of the invention is described with reference to a flow diagram of FIG. 10. At block 1002, virtual appliances are deployed in the cloud architecture, where each of the virtual appliances includes a proxy service. At block 1004, at least one virtual agent is instantiated in each of the virtual appliances, where each virtual agent performs a remote access function in the cloud architecture. At block 1006, a cloud framework is communicated with using the proxy service in each of the virtual appliances. At block 1008, the at least one virtual agent in each of the virtual appliances is controlled based on communications with the cloud framework.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for virtual agent management in a cloud architecture, the method comprising:
    deploying a plurality of virtual appliances in the cloud architecture, wherein each of the virtual appliances comprises a proxy service;
    instantiating at least one virtual agent in each of the virtual appliances, wherein each virtual agent performs a remote access function in the cloud architecture;
    communicating with a cloud framework using the proxy service in each of the virtual appliances; and
    controlling the at least one virtual agent in each of the virtual appliances based on communications with the cloud framework.

2. The method of claim 1, wherein instantiating the at least one virtual agent in each of the virtual appliances comprises:
    obtaining a container image of each of the at least one virtual agent; and
    in each of the virtual appliances, instantiating each of the at least one virtual agent as a virtual container based on the container image.

3. The method of claim 2, wherein deploying the virtual appliances in the cloud architecture comprises deploying the virtual appliances in at least one data center of a private cloud of the cloud architecture, and wherein communicating with the cloud framework using the proxy service in each of the virtual appliances comprises communicating with the cloud framework in a public cloud of the cloud architecture using the proxy service in each of the virtual appliances.

4. The method of claim 3, wherein each virtual agent performs a remote access function for a software service in the public cloud of the cloud architecture.

5. The method of claim 1, wherein communicating with the cloud framework using the proxy service in each of the virtual appliances comprises receiving a plurality of executable commands from the cloud framework, and wherein controlling the at least one virtual agent in each of the virtual appliances based on communications with the cloud framework comprises executing the executable commands using virtual agents of the virtual appliances.

6. The method of claim 1, wherein deploying the virtual appliances in the cloud architecture comprises deploying the virtual appliances in the cloud architecture with a plurality of security keys and a plurality of security certificates, and wherein the method further comprises:
transmitting a plurality of registration requests from the virtual appliances to the cloud framework, wherein the registration requests comprise the security keys and the security certificates; and
determining which virtual agents to instantiate in the virtual appliances based on the registration requests.

7. The method of claim 1, wherein the method further comprises:
associating a plurality of software services in the cloud architecture with the proxy services of the virtual appliances, wherein the virtual agents in the virtual appliances perform remote access functions for the software services.

8. The method of claim 1, wherein the method further comprises:
deciding on a plurality of service tags for a plurality of software services in the cloud architecture; and
creating a plurality of command definitions and templates for instantiating the virtual agents in the virtual appliances based on the service tags, wherein the virtual agents in the virtual appliances perform remote access functions for the software services.

9. The method of claim 1, wherein the method further comprises:
generating a new container image for a first virtual agent in a first virtual appliance of the virtual appliances;
registering a new version of the first virtual agent that corresponds to the new container image; and
updating the first virtual agent to the new version based on the new container image.

10. The method of claim 9, wherein updating the first virtual agent to the new version based on the new container image comprises updating the first virtual agent to the new version based on the new container image when the first virtual appliance restarts.

11. A non-transitory computer-readable storage medium containing program instructions for virtual agent management in a cloud architecture, wherein execution of the program instructions by one or more processors causes the one or more processors to perform steps comprising:
deploying a plurality of virtual appliances in the cloud architecture, wherein each of the virtual appliances comprises a proxy service;
instantiating at least one virtual agent in each of the virtual appliances, wherein each virtual agent performs a remote access function in the cloud architecture;
communicating with a cloud framework using the proxy service in each of the virtual appliances; and
controlling the at least one virtual agent in each of the virtual appliances based on communications with the cloud framework.

12. The non-transitory computer-readable storage medium of claim 11, wherein instantiating the at least one virtual agent in each of the virtual appliances comprises:
obtaining a container image of each of the at least one virtual agent; and
in each of the virtual appliances, instantiating each of the at least one virtual agent as a virtual container based on the container image.

13. The non-transitory computer-readable storage medium of claim 12, wherein deploying the virtual appliances in the cloud architecture comprises deploying the virtual appliances in at least one data center of a private cloud of the cloud architecture, and wherein communicating with the cloud framework using the proxy service in each of the virtual appliances comprises communicating with the cloud framework in a public cloud of the cloud architecture using the proxy service in each of the virtual appliances.

14. The non-transitory computer-readable storage medium of claim 13, wherein each virtual agent performs a remote access function for a software service in the public cloud of the cloud architecture.

15. The non-transitory computer-readable storage medium of claim 11, wherein communicating with the cloud framework using the proxy service in each of the virtual appliances comprises receiving a plurality of executable commands from the cloud framework, and wherein controlling the at least one virtual agent in each of the virtual appliances based on communications with the cloud framework comprises executing the executable commands using virtual agents of the virtual appliances.

16. The non-transitory computer-readable storage medium of claim 11, wherein deploying the virtual appliances in the cloud architecture comprises deploying the virtual appliances in the cloud architecture with a plurality of security keys and a plurality of security certificates, and wherein the steps further comprise:
transmitting a plurality of registration requests from the virtual appliances to the cloud framework, wherein the registration requests comprise the security keys and the security certificates; and
determining which virtual agents to instantiate in the virtual appliances based on the registration requests.

17. The non-transitory computer-readable storage medium of claim 11, wherein the steps further comprise:
associating a plurality of software services in the cloud architecture with the proxy services of the virtual appliances, wherein the virtual agents in the virtual appliances perform remote access functions for the software services.

18. The non-transitory computer-readable storage medium of claim 11, wherein the steps further comprise:
deciding on a plurality of service tags for a plurality of software services in the cloud architecture; and
creating a plurality of command definitions and templates for instantiating the virtual agents in the virtual appliances based on the service tags, wherein the virtual agents in the virtual appliances perform remote access functions for the software services.

19. A system for virtual agent management in a cloud architecture, the system comprising:
- memory; and
- one or more processors configured to:
  - deploy a plurality of virtual appliances in the cloud architecture, wherein each of the virtual appliances comprises a proxy service;
  - instantiate at least one virtual agent in each of the virtual appliances, wherein each virtual agent performs a remote access function in the cloud architecture;
  - communicate with a cloud framework using the proxy service in each of the virtual appliances; and
  - control the at least one virtual agent in each of the virtual appliances based on communications with the cloud framework.

20. The system of claim 19, wherein the one or more processors are further configured to:
- obtain a container image of each of the at least one virtual agent; and
- in each of the virtual appliances, instantiate each of the at least one virtual agent as a virtual container based on the container image.

* * * * *